United States Patent
Haldeman et al.

(10) Patent No.: US 6,170,441 B1
(45) Date of Patent: Jan. 9, 2001

(54) ENGINE SYSTEM EMPLOYING AN UNSYMMETRICAL CYCLE

(75) Inventors: Charles W. Haldeman, Concord; Brian S. Ahern, Boxboro, both of MA (US)

(73) Assignee: Quantum Energy Technologies, Cambridge, MA (US)

( * ) Notice: Under 35 U.S.C. 154(b), the term of this patent shall be extended for 0 days.

(21) Appl. No.: 09/105,734

(22) Filed: Jun. 26, 1998

(51) Int. Cl.[7] ............................ F02B 47/02; F02B 77/11
(52) U.S. Cl. ........................................ 123/25 D; 123/668
(58) Field of Search ...................... 123/90.15, 316, 123/193.6, 25 D, 668, 669, 25 C; 60/320

(56) References Cited

U.S. PATENT DOCUMENTS

| | | | |
|---|---|---|---|
| Re. 32,802 | 12/1988 | Kline | 123/65 VD |
| 3,082,752 | * 3/1963 | Thomas | 123/668 |
| 4,018,194 | 4/1977 | Mitchell et al. | 123/276 |
| 4,034,723 | 7/1977 | Hamparian | 123/41.76 |
| 4,074,671 | * 2/1978 | Pennila | 123/668 |
| 4,081,252 | 3/1978 | Osborg | 44/314 |
| 4,185,593 | * 1/1980 | McClure | 123/1 A |
| 4,197,081 | 4/1980 | Osborg | 431/2 |
| 4,201,553 | 5/1980 | Osborg | 44/314 |
| 4,368,711 | * 1/1983 | Allan | 123/522 |
| 4,412,512 | * 11/1983 | Cottell | 123/25 E |
| 4,424,790 | 1/1984 | Curtil | 60/224 |
| 4,552,106 | * 11/1985 | Spence | 123/198 A |
| 4,574,590 | 3/1986 | Jones | 60/676 |
| 4,594,991 | * 6/1986 | Harvey | 123/557 |
| 4,611,557 | * 9/1986 | Hierzenberger | 123/25 B |
| 4,798,184 | * 1/1989 | Palko | 123/316 |
| 4,998,517 | 3/1991 | Kawamura | 123/270 |
| 5,107,802 | 4/1992 | Yagi et al. | 123/90.15 |
| 5,161,497 | * 11/1992 | Simko et al. | 123/90.15 |
| 5,243,938 | 9/1993 | Yan | 123/197.1 |
| 5,341,771 | * 8/1994 | Riley | 123/48 AA |
| 5,354,608 | 10/1994 | Keelan et al. | 428/312.2 |
| 5,477,820 | 12/1995 | Rao | 123/193.6 |
| 5,718,194 | 2/1998 | Binion | 123/25 C |

\* cited by examiner

*Primary Examiner*—Andrew M. Dolinar
*Assistant Examiner*—Hai Huynh
(74) *Attorney, Agent, or Firm*—Choate, Hall & Stewart

(57) ABSTRACT

Highly efficient engine. The system includes an internal combustion engine having at least one piston in a cylinder, the cylinder including a cylinder head. The engine operates on an unsymmetrical expansion and compression cycle wherein the expansion portion of the cycle is greater than the compression portion of the cycle. The piston and cylinder head are lined with an insulating material having a selected thermal diffusivity. Apparatus is provided for injecting a supercritical mixture of fuel and water into the cylinder of the engine. The combination of these aspects results in a highly efficient engine.

15 Claims, 2 Drawing Sheets

ENGINE SYSTEM EMPLOYING AN UNSYMMETRICAL CYCLE

BACKGROUND OF THE INVENTION

This invention relates to a highly efficient engine employing an unsymmetrical expansion and compression cycle along with the use of a supercritical mixture of fuel and water.

The operation of internal combustion engines is generally a trade-off between efficiency of the engine and cleanliness of the exhaust. For example, diesel engines provide high efficiency but the exhaust usually includes particulate matter (PM) such as soot and nitric oxide ($NO_x$). In general, internal combustion engines, whether spark ignition or diesel, operate on a symmetrical cycle. That is, compression volume equals expansion volume. Ralph Miller in U.S. Pat. No. 2,670,595 was the first to describe an engine operating on an unsymmetrical cycle. He recognized that closing intake valves either before or after bottom dead center (BDC) could change the "effective" compression ratio in an engine.

For example, by doubling the length of the stroke of the engine and closing the intake valve early when the piston is halfway down toward bottom dead center (BDC), the amount of compressed air is reduced by one-half, giving the same effective compression ratio as the original engine. No work is done on the air inside the cylinder during expansion to bottom dead center and subsequent compression back to atmospheric pressure. At the same fuel-air ratio the same peak pressures will be felt by the engine components. If the expansion ratio is left unchanged, then the combusting gases can expand to twice the volume. This increased expansion reduces heat loss to the exhaust and allows the combustion products to do additional work by reaching a lower temperature prior to opening of the exhaust valve(s). Thereby, the engine extracts more useful mechanical energy.

Historically, this unsymmetrical cycle innovation went largely unnoticed because it called for an increase in size and weight for the engine providing the same power. This size and weight penalty was unacceptable to the engine industry of the 1950's and 1960's during which time the single most important figure of merit was horsepower/cubic inch of engine displacement. Also, Miller's proposed mechanism for variable valve timing was cumbersome and did not provide as much valve timing angle variation as desired.

In 1992 Ozawa (see U.S. Pat. No. 5,682,854) discussed ways of overcoming this deficiency in power output by developing a variable compression/expansion ratio. His system used a planetary gear drive designed to alter the position of the intake valve camshaft. Mechanical actuators on the planet carrier physically rotated the camshaft forward or backward in response to the engine's need for power at the expense of engine cycle efficiency. Ozawa's innovation has been commercially realized in vehicles built by the Mazda Corporation. In particular, the Mazda Millennia, introduced in 1994, employs a continuously variable cam component to combine high power capability with high efficiency.

Engines generally use solid metal pistons and cylinder heads and because of the solid metal, the a thermal diffusivity is high. The thermal diffusivity is selected so that the surface temperature of the pistons and cylinder heads remain low enough to avoid thermal stress cracking of the surface under the repeated cyclic heating resulting from engine combustion. This avoidance of thermal stress cracking requires relatively low operating temperatures (300° F.–500° F.) for aluminum pistons and heads. This temperature is maintained by the engine cooling system removing the heat transferred by the combustion process. Of course, such heat is not available for conversion to work in the engine expansion cycle. Thus, heat transfer through solid metal pistons and heads results in loss of efficiency. A reduction in such heat transfer through pistons and cylinder heads will therefore improve the overall thermal efficiency of the engine.

Copending U.S. patent application Ser. No. 08/992,983 filed on Dec. 18, 1997 discloses a supercritical water/fuel composition and combustion system in which a mixture of water and a hydrocarbon fuel is maintained near or above the thermodynamic critical point such that the mixture is a homogeneous single phase. As taught in that application, because the water/hydrocarbon fuel mixture is maintained as a homogeneous isotropic single phase it will combust more completely when introduced into a combustion chamber.

It is well known in the engine system art that liquid fuel combustion relies on spray atomization followed by fuel droplet evaporation and finally on the combustion reaction sequence. Smaller droplets favor more complete and cleaner combustion. Prior art approaches used extremely high injection pressures to minimize the droplet diameters. Fuel preheating and chemical surfactants produce smaller droplets, but such fuel preheating and chemical surfactants produce only modest reductions in droplet size and heating is only effective up to 150° C. to 200° C. Above these temperatures excessive coke, gum, and tar formation blocks operating flow channels in the fuel delivery system.

It is therefore desirable to create a highly efficient engine system by combining an unsymmetrical cycle with a supercritical water/fuel mixture along with controlled thermal diffusivity in the piston and cylinder head.

SUMMARY OF THE INVENTION

In one aspect, the engine system of the invention includes an internal combustion engine having at least one piston in a cylinder, the cylinder including a cylinder head. Apparatus cooperating with the piston creates an unsymmetrical expansion and compression cycle wherein the expansion portion of the cycle is greater than the compression portion of the cycle. An insulating material having a selected thermal diffusivity is applied to a surface of the piston and the cylinder head to reduce heat transfer therethrough. In one embodiment apparatus is provided for injecting a supercritical mixture of fuel and water into the cylinder for combustion. In another embodiment, the expansion portion of the cycle is greater than the compression portion of the cycle by a factor in the range of 1.3:1 to 2.5:1. The unsymmetrical cycle may be achieved through an increased stroke length. Alternatively, the unsymmetrical cycle can be achieved by decreasing the enclosed volume at the top of the compression stroke combined with early closing of the engine intake valve. While late closing of the air intake valve can accomplish the unsymmetrical compression, this operation involves additional pumping work in first drawing in the full charge and then pumping half of it back out. Thus, the early closing is to be preferred on a thermodynamic cycle basis.

In other embodiments of the invention the injection apparatus injects the supercritical water/fuel mixture near the top of the compression stroke such as near top dead center. The invention also includes a heat exchanger for using engine waste heat to heat the supercritical mixture of fuel and water. A pump is provided for pressurizing the water/fuel mixture up to a pressure as high as 4000 psi before introduction into the heat exchanger. The heat exchanger may be thermally coupled to the exhaust from the engine.

In yet another embodiment, electrical preheating is provided for the water/fuel mixture. This preheating may be needed during start up or whenever exhaust temperature is below a desired preheating level. This electrical preheating may also include feedback control apparatus for controlling the preheating. It is preferred that the supercritical mixture be at approximately 4000 psi and approximately 400° C.

The engine system of the present invention is highly efficient. The unsymmetrical Miller cycle reduces heat loss to the exhaust. The insulating material lining the head and piston reduces heat loss to the engine coolant. Further, water and fuel are preheated by exchanging heat with the engine cooling and/or exhaust streams to result in a supercritical mixture of water and fuel. The addition of water enables the heating of the supercritical water/fuel mixture to temperatures exceeding 400° C. without the formation of char or coke. Finally, the injection of the homogeneous, near critical water/fuel mixture eliminates concerns for droplet evaporation. The use of supercritical water/fuel results in a homogeneous single phase and avoids droplets which serve as nucleation centers from particulate matter production and hot spots for $NO_x$ formation when cold pure fuel is used.

The supercritical water/fuel mixture is a dense fluid which when heated and injected introduces an additional 4% enthalpy and gain in efficiency to the combustion cycle. The unsymmetrical Miller cycle, with an expansion ratio up to twice the compression ratio can add an additional 15% absolute efficiency on top of the enthalpy gain and the efficiency is further improved by employing insulating surfaces on the piston and cylinder head. By combining the unsymmetrical Miller cycle, insulated piston and head, and supercritical water fuel injection, record efficiencies are achieved along with sharp reductions in emissions. Of course, combinations of any two of these three conditions will result in efficiency improvements.

DESCRIPTION OF THE PREFERRED EMBODIMENT

Figure 1:
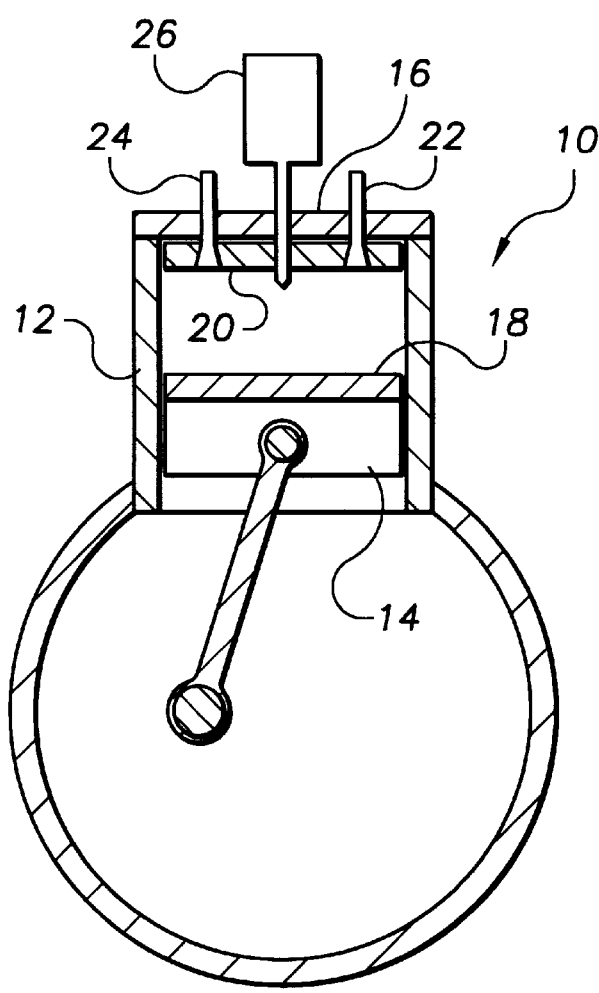
FIG. 1 is a cross-sectional view of an internal combustion engine according to the invention.

The thermodynamic advantage of the unsymmetrical Miller cycle provides a means of reducing heat loss to the exhaust from an engine. The reduction in power per cubic inch resulting from the lowered air flow can in part be compensated by reducing heat transfer to the head and piston and by the added enthalpy of the injected water/fuel mixtures. The present invention provides for chemically as well as mechanically improving the efficiency of an internal combustion engine. Preferred embodiments will be discussed in terms of diesel technology but the invention is not limited to that application. It is equally applicable to spark ignition engines.

The expansion work of gases in a cylinder can be affected by three important properties of the reactants injected near top dead center. The quality of reactants, their combustibility and their initial temperature generally affect the pressure increase through combustion before the early stage of expansion. Any process that can speed up the evolution of this pressure development without adding additional pollutants to the exhaust stream is considered desirable. The present invention addresses improvements in all three of these categories.

As mentioned above, it is known that liquid fuel combustion relies on spray atomization followed by fuel droplet evaporation and finally the combustion reaction sequence. The present invention contemplates water-cracking action to produce more combustible species. Water mixed with diesel fuel at temperatures above 200° C. reduces the formation of coke and gum since hydrocarbon fuels are reduced in molecular weight by partial conversion to $H_2$ and CO gases and reduction of chain length. Therefore, water and fuels mixed together and heated above or near thermodynamically critical conditions offer an economical solution to droplet size reduction. Additionally, $H_2$ gas made by steam reforming provides cetane enhancement, as it possesses a wider flammability limit which allows ignition at locally lower oxygen concentrations. The $H_2$ molecules thereby serve as combustion initiators that are well distributed in the reaction zone. The wide flammability limits of hydrogen gas enable overall fuel lean operation. This lean operation in turn limits the production of nitric oxides. Accordingly, supercritical mixing raises the "effective cetane number" for the fuel mixture. The experimental details of supercritical chemistry will be discussed in more detail below. Reference again is made to copending application Ser. No. 08/992,983 filed on Dec. 18, 1997, the teachings of which are incorporated herein by reference. As disclosed in that application the supercritical mixture of fuel and water results in a homogeneous single phase. With such a homogeneous near critical mixture, gaseous mixing takes place with the air. Thus, droplet evaporation is not an operative process and does not limit mixing. Diffusion of oxygen to the reactants is thereby accelerated. The high average temperature of the reactants exceeds the auto ignition temperature and oxidative reactions occur instantaneously. The combustion process is controlled by gas phase diffusion, which is much faster than liquid phase diffusion in droplets. As a result, the ignition delay is nearly eliminated and combustion is more homogeneous within a cylinder.

This rapid initiation of combustion is limited by the penetration rate of the supercritical reactants. Momentum and mass transfer considerations limit the penetration rate of the supercritical reactants into the heated air at top dead center. The diffusion rate is temperature dependent; thus the 400° C. injection temperature further promotes reactant mixing. Additionally, the injection pressures maintained above 3600 psi induce supersonic velocities out of an injector orifice. As a result, penetration and mixing of the reactants is much faster than for liquid droplets.

The high temperature of the water/fuel mixture at injection brings in about 4% additional enthalpy. If this amount of heat energy is extracted from engine waste heat, then all of this recuperated energy can be converted to mechanical energy in the expansion cycle of an engine.

Figure 2:
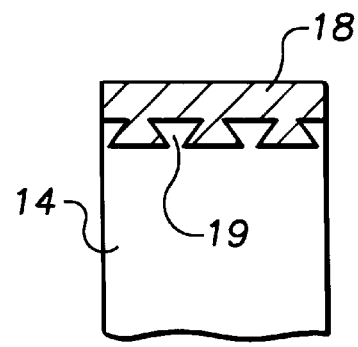
FIG. 2 is a cross-sectional view of a dovetail arrangement for attaching insulating liners.

With reference now to FIG. 1, an internal combustion engine 10 includes a cylinder 12 in which is contained a piston 14. The cylinder 12 includes a cylinder head portion 16. According to one aspect of the invention, insulating liners 18 and 20 are placed on a surface of the piston 14 and the head 16 respectively as shown. The liners 18 and 20 are relatively thick (0.06 to 0.1 inch) and are formed from a high temperature material having a low thermal diffusivity. The liners 18 and 20 are attached to the top of the piston 14 and the inner surface of the cylinder head 16 lining the reentrant combustion bowl in a manner to provide poor thermal contact with the rest of the piston 14 and head 16 while maintaining a secure mechanical attachment. For example, a nickel, titanium, or Inconel piston liner 18 can be threaded into the top of the piston 14. Alternatively as shown in FIG. 2, the liners 18 and 20 may include dovetail slots 19 and the piston 14 and head 16 are forged or cast over the slots 19. Some of the slots 19 should be at right angles to one another to permanently lock all motion. Those skilled in the art will appreciate that other permanent locking methods may be used.

The lining 18 can operate at 2000° F. transferring only a small amount of heat to the piston because of the loose fitting thread which also accommodates thermal expansion size changes. At the high temperatures, less heat is removed during combustion and some of this heat is re-transferred to the compressed charge at the top of the compression stroke. Because heat transfer depends strongly on velocity and density of air in the cylinder 12, this heat is mainly added at the top of the stroke where it is thermodynamically favorable. Not much heat is lost during the intake stroke where pressure and velocity are low. A similar insulating liner 20 is used in the central area of the head 16 over the piston cavity. Note that these insulating liners 18 and 20 are carefully selected to have the correct thermal mass and thermal diffusivity. These liners cannot be fully adiabatic because the surface temperature would then reach levels of 4,000–5,000° F. which will cause melting or thermal fatigue of the surface of the liners 18 and 20. The liners 18 and 20 can, however, significantly reduce heat loss from the combustion gas.

As discussed above, an important aspect of this invention is the unsymmetrical expansion and compression cycle of the engine 10. The engine 10 includes an intake valve 22 and an exhaust valve 24. As will be appreciated by those skilled in the art, there may be multiple intake and exhaust valves in a cylinder. An injection system 26 injects supercritical fuel/water into the cylinder 12. One way of achieving an expansion portion greater than the compression portion is to close the intake valve 22 early as the piston 14 proceeds downward. For example, if the intake valve closes when the piston 14 is halfway down toward bottom dead center, the compression ratio is reduced by one-half whereas the expansion portion of the cycle would be the full stroke of the piston 14. When the piston is at or near top dead center the injection system 26 injects the supercritical waterfuel mixture into the cylinder 12 and the power stroke commences.

Figure 3:
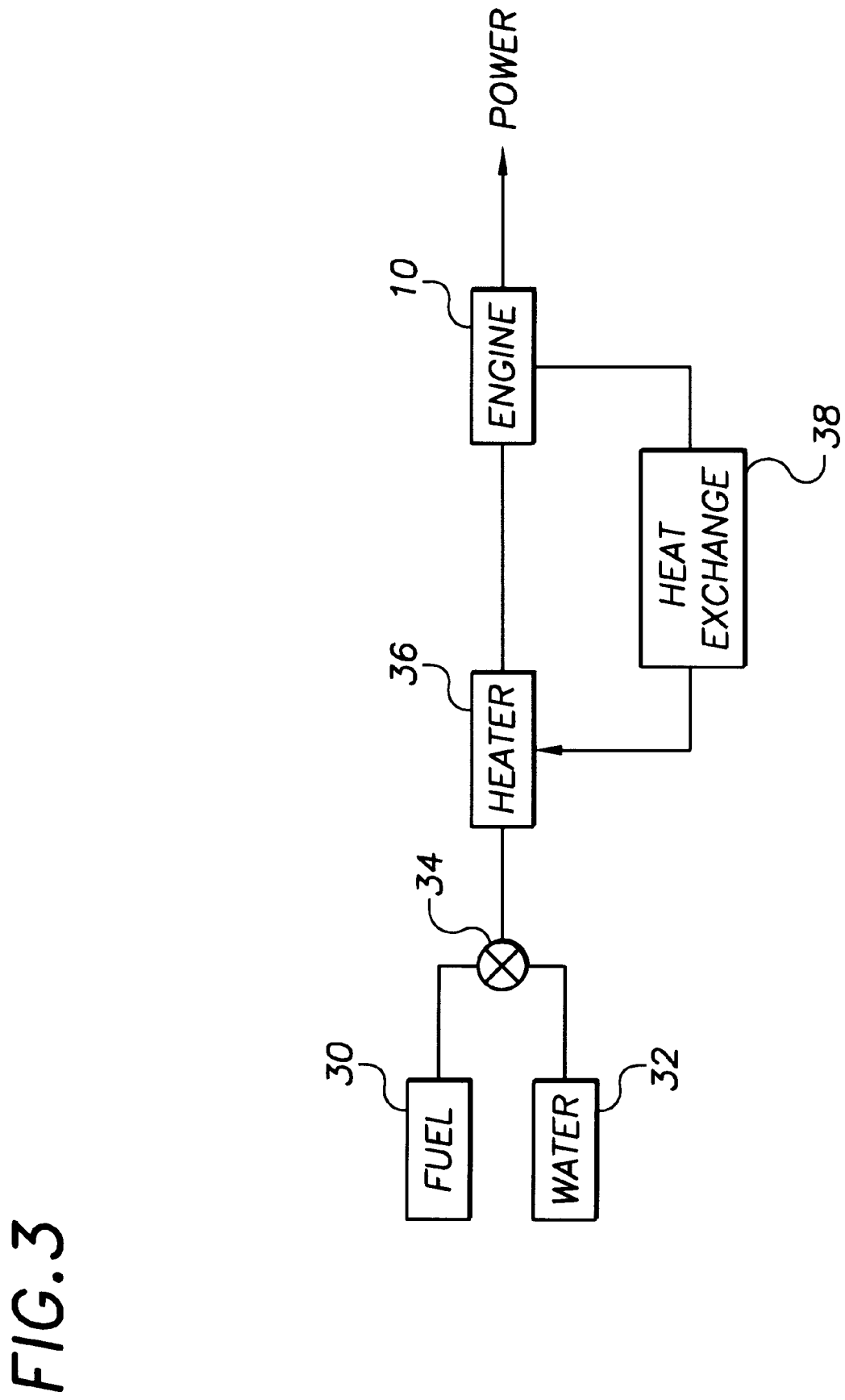
FIG. 3 is a block diagram of the system of the invention.

Another aspect of the invention which results in the high efficiency of the system of the invention is the use of engine waste heat to preheat the supercritical water/fuel mixture injected into the cylinder. FIG. 3 illustrates this aspect of the system of the invention. Fuel 30 and water 32 are pumped by a pump 34 to a pressure in the range of 4000 psi. The water/fuel mixture then passes through a heater portion 36 and is injected into the engine 10 which produces a power output. Waste heat from the engine, either in an exhaust stream or absorbed by a cooling system passes through a heat exchanger 38 and the recovered heat is applied to the heater 36.

Additional electrical energy may be supplied to the heater 36 to bring the supercritical water/fuel mixture up to approximately 400° C. Those skilled in the art will appreciate that a temperature and pressure feedback loop may be provided to actively control the amount of electrical energy needed to optimally adjust the conditions of the water/fuel mixture prior to delivery to the engine 10.

Combining the enhanced solvating power of supercritical water along with the enhanced transport properties of a dense gas are desirable from a chemical reaction perspective. Elevated temperatures promote reformulation chemistry but the reaction rates are often limited by the diffusivity of species to and from a heterogeneous catalytic surface. The diffusivity of a dense, supercritical gas is 3–4 orders of magnitude higher than a typical liquid. Correspondingly, the gas at the supercritical pressures maintains a density of nearly 60% of that of the liquid state so fuel volume flow is not excessive. This rapid reaction chemistry enables engines to be retrofitted with heat exchangers that can mix and hold water/fuel mixtures for residence times of about one minute.

The present invention is advantageous for enhancing combustion of many hydrocarbon fuels including gasoline, diesel fuel, heavy distillates, bunker C, kerosene, natural gas, crude oil, bitumen or other carbon containing material. The current invention using a fuel/water injection system operating at critical or near critical conditions of approximately 4000 psi and 400° C. will provide significant advantages. The higher temperature will provide less ignition delay and will add enthalpy to the combustion process. The use of exhaust heat to provide the required temperatures creates a thermodynamic regeneration which adds several percent to engine cycle efficiency in addition to accompanying improvements in emission as a result of faster, more complete combustion. Expanding the supercritical fuel mixture into the heated air in the cylinder 12 provides better mixing so that combustion occurs more uniformly throughout the mass of the supercritical water/fuel mixture thereby eliminating the time delay implicit in droplet evaporation. The high temperature solvation enables low grade fuels such as #4, #6 and bunker C to be burned more efficiently and cleanly then currently possible.

The benefits of the injection of supercritical water/fuel are enhanced with the inclusion of the insulating liners and the unsymmetrical Miller cycle. The insulating liners intercept heat loss to the engine cooling system but redirect it toward the exhaust. The unsymmetric Miller cycle will expand to much lower than normal temperatures so that the added heat from the piston liners is extracted. Such a combination of co-acting elements including insulating piston liners and unsymmetrical Miller cycle can produce significant increases in overall engine efficiency.

EXAMPLES

The advantage of the unsymmetrical cycle can be seen from the following Table 1 comparing two diesel cycles assuming no heat losses and adiabatic compression and expansion.

TABLE 1

Comparison for Diesel - 1 lb. Air - 1/30 lb. Fuel 600 BTU

| Step | Symmetrical 20:1 | 20:1–40:1 |
|---|---|---|
| i.i |  | Intake ½ cylinder of air 13.6 ft.$^3$ 0 work |
| i. | Intake at 14.7 psi or 540 deg. R<br>w = 0 work | Expand to 2 vol. and back to 13.6 ft.$^3$<br>14.7 psi 540 deg. R - 0 work |
| 1 | Adiabatic compression from p1 = 14.7 psi,<br>T1 = 540 R v1 = 13.6 ft.$^3$ to p2 = 974 psi<br>T2 = 1789 deg. R work = 213.9 BTU | Adiabatic compression to 974 psi 1789 deg<br>Rv ÷ .68 ft.$^3$ W = 213.9 BTU |
| 2 | Heat at constant volume to p$^3$ = 2000 psi<br>T3 = 3674 R Q = 320 BTU work = 0 | Constant volume heat addition to 2000 psi<br>3674 deg. R W = 0 Q = 320 BTU |
| 3 | Add heat at constant pressure Q = 280 BTU<br>to T4 = 4841 deg. R v4 = .895 ft.$^3$<br>Vol. ratio = 1.317 work = 79.9 BTU | Constant pressure heat attained to 2000 psi<br>4841 deg. R v = .896 W = 79.9 BTU<br>Q = 280 BTU |
| 4 | Expand adiabatically to bottom dead<br>center, ex ratio = 15.18 (remaining ratio of<br>20:1) to T5 - 1630 deg. R p5 = 44.3 psi<br>This produces 550.4 BTU of work | Adiabatic expansion to bottom dead center<br>30.37:1 ratio v = .896 to 27.2 ft.$^3$<br>p = 16.8 psi T = 1235 deg. R<br>W = 617.8 BTU |
| 5 | Exhaust against 44.3 psi 13.6 × (44.3 –<br>14.7 = 74.5 BTU<br>W = 550.4 + 79.9 – 213.9 – 74.5 = 341.9<br>BTU | Exhaust against 16.8 psi 27.2 × (16.8–<br>14.7) × 144 = 10.6 BTU<br>Network = 617.8 + 79.9 – 213.9 – 10.6 =<br>473.2 |
|  | $\eta = \dfrac{341.9}{600} = 56.9\%$ | $\eta = \dfrac{473.2}{600} = 78.8\%$ |

The very high density of individual molecules in a supercritical fluid offers desirable reaction enhancing properties. These reaction enhancing properties are directly related to the improved transport of reactants since the diffusivity of a dense gas is orders of magnitude greater than a liquid. Transport properties have been observed to vary by 3–4 orders of magnitude near $T_{crit}$. M. McHugh and V. Krukonis, "Super Critical Fluid Extraction," Butterworth Heinemann, Ed., Newton, Mass. 1994. Above the critical temperature of water certain reaction products are favored by increases in pressure. The reaction rates are not merely increased because the thermophysical properties are enhanced. Intrinsically different reaction coordinates begin to compete and shift the product concentration profiles.

With respect to solution of fuel in supercritical water, positive results have already been observed. Preliminary experiments have been conducted at the Energy Lab of the Massachusetts Institute of Technology.

A hermetic chamber was fabricated from an Inconel 625 alloy. The chamber contained a 10 cm$^3$ internal volume clamped at either end with sapphire windows for viewing. Various concentrations of water and diesel fuel were admitted to this chamber for isobaric testing. A constant pressure was established for each experiment and the temperature was raised and lowered at a controlled rate 2° C. per minute.

The first experiment established a constant pressure of 2000 psi and the mixture of 80% diesel fuel and 20% water was heated to beyond $T_c$ of water to 400° C. At 2000 psi and 400° C. the pressure was too low and the temperature too high to maintain water in the liquid state. A dense gas formed on top of the still liquefied diesel fuel and no complete mixing was observed.

As a matter of reference, water had a density of about 0.32 gm/cm$^3$ below its critical temperature of 374° C. with a critical pressure of about 3250 psi. Diesel fuel has a wide range of molecular weight compounds and as such does not have a well defined critical temperature. The fact that the diesel fuel retained its liquid properties at 400° C. lends evidence that it has not reached its critical temperature. Adding more thermal energy to diesel fuel without water included would break and reform many bonds, turning the material to a combination of a dense gas and heavy residue.

In a second experiment, the pressure was maintained at 3000 psi while the same mixture was heated at 2° C. per minute. Surprisingly, at 360° C. the two fluids mixed completely and formed a supercritical fluid. This fluid behaves as a dense gas with no surface tension or other liquid-like properties. It is of interest to note that this phase change occurred below the critical conditions for both water and diesel as separate fluids. This second experiment suggested that the role of pressure was paramount to the phase behavior. The solvating power of the water increased by orders of magnitude within a specific range of pressure and temperature.

A third experiment was made to examine aspects of this pressure parameter on the nature of phase behavior. The pressure was increased to 4000 psi and once again the temperature of the reaction vessel was increased at a rate of 2° C. per minute. In this instance, the temperature at which both liquids mixed supercritically was increased to 378° C. The supercritical mixing temperature was increased from 363° C. up to 378° C. by the addition of 1000 psi. This counter-intuitive trend suggests that there is an optimal pressure and temperature point for a given water/fuel mixture and this phase stability relationship is the subject of continuing research.

The salvation properties of supercritical water discussed above prompted an investigation into the burn characteristics of this new state of matter. An apparatus was fabricated capable of mixing water and fuel together at high pressure (up to 5000 psi at 20 ml per minute). The high pressure mixture was fed into a coil of small diameter stainless steel tubing with an OD of 0.063 inches and an ID of 0.023 inches.

Ten feet of such tubing was wound around a 1.5 inch diameter mandrel and placed inside a series of band heaters capable of bringing the flowing fluid up to the desired temperature in a controlled manner. The temperature was maintained by a thermocouple feedback loop to a proportional, integral, differential (PID) heater controller.

The pressure was maintained manually by adjusting the flow rate through a dual cylinder positive displacement pump.

The flow out of the injector nozzle was controlled largely by the exit orifice and the pressure of the supply. Our system was analyzed and designed to maintain a flow of about 10 ml per minute of the supercritical mixture at 4000 psi and 400° C. This called for an exit orifice of 0.003 inch on the injector. Air flow was positively controlled by fabricating a plenum connected to a source of pressurized air. The flow of the intake air was measured with a ball-in-cylinder flow meter and the flow rate was controlled via a needle valve. Flame dynamics were controlled by adjusting the relative ratio of intake air to supercritical water/fuel flow. Additionally, the intake air manifold was fitted with band heaters to provide a capability of heating the air to 350° C.

Supercritical mixtures were produced, measured and injected into atmospheric conditions. The mixture exited the orifice at supersonic speed entraining a subsonic airstream and needed to be decelerated in a diverging nozzle to slow it down below the "flame speed" of the mixture. Such diverging nozzles were fabricated and connected to the injector tip. A controlled air plenum was also fixed to this nozzle to mix in the right proportion of air for combustion.

By adjusting the air flow together with the water/fuel flow, a stable flame was produced. While these conditions are not those of a diesel engine at TDC, the flame characteristics were much superior to straight diesel injection. The flame exhaust was directed into a silica flue with a characteristic length of three times the flame length. Emissions of $NO_x$, CO, $O_2$ and PM were made at the end of the silica tube. Silica was used because it can withstand high flame temperature and still remain clear for visual inspection.

The results using supercritical water/diesel feed are much superior to those with #2 and #6 fuel feed as can be seen in Table 2.

TABLE 2

| Fuel Sprayed | Diesel | Diesel-30% H2O | S.C. 35% Diesel-35% #6-30% H2O |
|---|---|---|---|
| Carbon Monoxide (%) | 100 | 150 | 0.00% |
| Unburned Hydrocarbons (ppm) | 60 | 100 | <12 |
| Particulate Matter (AVL Smoke Number) | 2.0 | 1.4 | <0.1 |
| NOx (ppm) | 120 | 90 | 18 |

It is recognized that modifications and variations of the present invention will be apparent to those skilled in the art and it is intended that all such modifications and variations be included within the scope of the appended claims.

What is claimed is:

1. Engine system comprising:
   an internal combustion engine having at least one piston in a cylinder, the cylinder including a cylinder head;
   apparatus cooperating with the piston to create an unsymmetrical expansion and compression cycle wherein the expansion portion of the cycle is greater than the compression portion of the cycle; and
   insulating material having a selected thermal diffusivity on a surface of the piston and cylinder head, said insulating material having a thickness in the range of 0.06 to 0.1 inches and a thermal diffusivity in the range of at least approximately 0.1 to approximately $0.8 ft^2/hr$.

2. The system of claim 1 further including apparatus for injecting a supercritical mixture of fuel and water into the cylinder.

3. The system of claim 2 wherein the injection apparatus injects the supercritical mixture of fuel and water near the top of the compression stroke.

4. The system of claim 3 wherein the injection apparatus injects the mixture near top dead center.

5. The system of claim 2 further including heat exchanger means for using engine waste heat to heat the supercritical mixture of fuel and water.

6. The system of claim 5 further including pump means for pressurizing the water and fuel mixture to approximately 4000 psi before introduction into the heat exchanger.

7. The system of claim 4 wherein the heat exchanger is thermally coupled to exhaust from the engine.

8. The system of claim 5 further including electrical preheating for the water/fuel mixture.

9. The system of claim 8 further including feedback control apparatus for controlling the electrical preheating.

10. The system of claim 2 wherein the supercritical mixture is at approximately 4000 psi and 400° C.

11. The system of claim 1 wherein the expansion portion of the cycle is greater than the compression portion of the cycle by a factor in the range of 1.3:1 to 2.5:1.

12. The system of claim 1 wherein the apparatus for creating the unsymmetrical cycle comprises an increased stroke length.

13. The system of claim 1 wherein the apparatus for creating an unsymmetrical cycle comprises a decreased enclosed volume at the top of the compression stroke.

14. Engine system comprising:
   an internal combustion engine having at least one piston in a cylinder, the cylinder including a cylinder head;
   insulating material having a selected thermal diffusivity on a surface of the piston and cylinder head, said insulating material having a thickness in the range of 0.06 to 0.1 inches and a thermal diffusivity in the range of at least approximately 0.1 to approximately $0.8 ft^2/hr$; and
   apparatus for injecting a supercritical mixture of fuel and water into the cylinder.

15. Engine system comprising:
   an internal combustion engine having at least one piston in a cylinder, the cylinder including a cylinder head;
   apparatus cooperating with the piston to create an unsymmetrical expansion and compression cycle wherein the expansion portion of the cycle is greater than the compression portion of the cycle;
   insulating material having a selected thermal diffusivity on a surface of the piston and cylinder head, said insulating material having a thickness in the range of 0.06 to 0.1 inches and a thermal diffusivity in the range of at least approximately 0.1 to approximately $0.8 ft^2/hr$; and
   apparatus for injecting a supercritical mixture of fuel and water into the cylinder.

* * * * *